United States Patent
Wang et al.

(10) Patent No.: US 11,620,105 B2
(45) Date of Patent: *Apr. 4, 2023

(54) HYBRID FLOATING POINT REPRESENTATION FOR DEEP LEARNING ACCELERATION

(71) Applicant: International Business Machines Corporation, Armonk, NY (US)

(72) Inventors: Naigang Wang, Ossining, NY (US); Jungwook Choi, Chappaqua, NY (US); Kailash Gopalakrishnan, San Jose, CA (US); Ankur Agrawal, White Plains, NY (US); Silvia Melitta Mueller, Altdorf (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 199 days.

This patent is subject to a terminal disclaimer.

(21) Appl. No.: 17/128,407

(22) Filed: Dec. 21, 2020

(65) Prior Publication Data
US 2021/0109709 A1    Apr. 15, 2021

Related U.S. Application Data

(63) Continuation of application No. 16/269,346, filed on Feb. 6, 2019, now Pat. No. 10,963,219.

(51) Int. Cl.
*G06F 7/483* (2006.01)
*G06N 3/08* (2006.01)
*G06N 3/084* (2023.01)

(52) U.S. Cl.
CPC ............. *G06F 7/483* (2013.01); *G06N 3/084* (2013.01)

(58) Field of Classification Search
CPC .............................. G06F 7/483; G06N 3/084
See application file for complete search history.

(56) References Cited

U.S. PATENT DOCUMENTS 5,506,797 A    4/1996 Koshiba
10,963,219 B2 *    3/2021 Wang .................... G06N 3/084
(Continued)

FOREIGN PATENT DOCUMENTS

CN    104025043 A    9/2014
CN    104025044 A    9/2014
(Continued)

OTHER PUBLICATIONS

List of all IBM related dockets, 2020.
(Continued)

*Primary Examiner* — Chuong D Ngo
(74) *Attorney, Agent, or Firm* — Garg Law Firm, PLLC; Rakesh Garg; Jared Chaney (57) ABSTRACT

In an embodiment, a method includes configuring a specialized circuit for floating point computations using numbers represented by a hybrid format, wherein the hybrid format includes a first format and a second format. In the embodiment, the method includes operating the further configured specialized circuit to store an approximation of a numeric value in the first format during a forward pass for training a deep learning network. In the embodiment, the method includes operating the further configured specialized circuit to store an approximation of a second numeric value in the second format during a backward pass for training the deep learning network.

18 Claims, 8 Drawing Sheets

(56) References Cited

U.S. PATENT DOCUMENTS

| | | | |
|---|---|---|---|
| 2008/0270495 A1 | 10/2008 | Lundvall et al. | |
| 2008/0270506 A1 | 10/2008 | Lundvall et al. | |
| 2013/0212139 A1 | 8/2013 | Gschwind et al. | |
| 2019/0294964 A1* | 9/2019 | Ouchi | G06F 7/483 |
| 2019/0339938 A1* | 11/2019 | Wang | G06F 7/49947 |
| 2020/0210839 A1* | 7/2020 | Lo | G06N 20/00 |

FOREIGN PATENT DOCUMENTS

| | | |
|---|---|---|
| CN | 105634499 A | 6/2016 |
| CN | 107038014 A | 8/2017 |
| CN | 107273090 A | 10/2017 |
| CN | 107451658 A | 12/2017 |

OTHER PUBLICATIONS

Application No. 201910352202.5, OA 1, Nov. 16, 2022.
Deng et al., Reduced-Precision Memory Value Approximation for Deep Learning, Hewlett Packard Labs, 2015.

* cited by examiner

HYBRID FLOATING POINT REPRESENTATION FOR DEEP LEARNING ACCELERATION

TECHNICAL FIELD

The present invention relates generally to a method, system, and computer program product for optimizing computations involved in training a neural network. More particularly, the present invention relates to a method, system, and computer program product for hybrid floating point representation.

BACKGROUND

Since computer memory is limited, it is not possible to store numbers with infinite precision, no matter whether the numbers use binary fractions or decimal fractions. At some point a number has to be cut off or rounded off to be represented in a computer memory.

How a number is represented in memory is dependent upon how much accuracy is desired from the representation. Generally, a single fixed way of representing numbers with binary bits is unsuitable for the varied applications where those numbers are used. A physicist needs to use numbers that represent the speed of light (about 300000000) as well as numbers that represent the Newton's gravitational constant (about 0.0000000000667), possibly together in some application.

To satisfy different types of applications and their respective needs for accuracy, a general-purpose number format has to be designed so that the format can provide accuracy for numbers at very different magnitudes. However, only relative accuracy is needed. For this reason, a fixed format of bits for representing numbers is not very useful. Floating point representation solves this problem.

A floating point representation resolves a given number into three main parts—(i) A significand that contains the number's digits, (ii) An exponent that sets the location where the decimal (or binary) point is placed relative to the beginning of the significand. Negative exponents represent numbers that are very small (i.e. close to zero), and (iii) a sign (positive or negative) associated with the number.

A floating point unit (FPU) is a processor or part of a processor, implemented as a hardware circuit, that performs floating point calculations. While early FPUs were stand-alone processors, most are now integrated inside a computer's CPU. Integrated FPUs in modern CPUs are very complex, since they perform high-precision floating point computations while ensuring compliance with the rules governing these computations, as set forth in IEEE floating point standards (IEEE 754).

Deep learning neural networks, also referred to as Deep Neural Networks (DNN) are a type of neural networks. The configuring and training of DNNs is computation intensive. Over the course of the training of a DNN, many floating point computations have to be performed at each iteration, or cycle, of training. A DNN can include thousands if not millions of nodes. The number of floating point computations required in the training of a DNN scales exponentially with the number of nodes in the DNN. Furthermore, different floating point computations in the DNN training may potentially have to be precise to different numbers of decimal places.

Machine learning workloads tend to be computationally demanding. Training algorithms for popular deep learning benchmarks take weeks to converge on systems comprised of multiple processors. Specialized accelerators that can provide large throughput density for floating point computations, both in terms of area (computation throughput per square millimeter of processor space) and power (computation throughput per watt of electrical power consumed), are critical metrics for future deep learning systems.

SUMMARY

The illustrative embodiments provide a method, system, and computer program product. In an embodiment, a method includes configuring a specialized circuit for floating point computations using numbers represented by a hybrid format, wherein the hybrid format includes a first format and a second format. In an embodiment, a method includes operating the further configured specialized circuit to store an approximation of a numeric value in the first format during a forward pass for training a deep learning network.

In an embodiment, a method includes operating the further configured specialized circuit to store an approximation of a second numeric value in the second format during a backward pass for training the deep learning network. In an embodiment, the first format and the second format have the same bit width.

In an embodiment, the bit width of the first format and the second format is 8-bit. In an embodiment, a method includes further configuring the specialized circuit to apportion the first format and the second format into a sign bit, exponent bits (e), and mantissa bits (p). In an embodiment, an exponent bit of the first format is less than an exponent bit of the second format.

In an embodiment, the first format uses 8-bits, wherein the first format uses five bits as the exponent bits and two bits as the mantissa bits. In an embodiment, the second format uses 8-bits, wherein the second format uses six bits as the exponent bits and one bit as the mantissa bit.

In an embodiment, wherein the approximation of the numeric value is represented as a function of a multiple of a fraction, wherein the fraction is an inverse of a number of discrete values that can be represented using only the mantissa bits. In an embodiment, wherein the specialized circuit comprises a floating point unit (FPU).

In an embodiment, a method includes additionally configuring the specialized circuit to represent, in the hybrid format, infinity in the same manner as a "Not a Number" (NaN) value. In an embodiment, a method includes disregarding, in the hybrid format, while operating the specialized circuit, the sign bit when representing zero, infinity, and NaN.

In an embodiment, the hybrid format reserves only two representations, one reserved representation to represent zero and another reserved representation to represent NaN. In an embodiment, the hybrid format is a very low precision format (VLP format) comprising less than sixteen bits.

An embodiment includes a computer usable program product. The computer usable program product includes a computer-readable storage device, and program instructions stored on the storage device.

An embodiment includes a computer system. The computer system includes a processor, a computer-readable memory, and a computer-readable storage device, and program instructions stored on the storage device for execution by the processor via the memory.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

An FPU has a bit-width. The bit-width is a size, in terms of a number of binary bits used to represent a number in a floating point format (referred to hereinafter as a "format" or "floating point format"). One or more organizations, such as Institute of Electrical and Electronics Engineers (IEEE), have created standards pertaining to floating point formats. The presently used formats provide standard method of representing numbers using 16-bit, 32-bit, 64-bit, and 128-bit formats.

The illustrative embodiments recognize that larger the bit-width the more complex and larger is the FPU in terms of physical size of the semiconductor fabricated circuit as well as in the amount of electrical power consumed. Furthermore, the larger the FPU, the more time it consumes to produce an output of a computation.

Specialized computation circuits, and especially FPUs, are a well-recognized technological field of endeavor. The present state of the technology in this field of endeavor has certain drawbacks and limitations. The operations and configurations of the illustrative embodiments impart additional or new capabilities to improve the existing technology in this technological field of endeavor, especially in the area of improving computational efficiency of FPUs.

This optimization of the specialized circuit hardware results in improving another well-recognized technological field of endeavor, namely, neural network training. Specifically, an FPU configured and operated in accordance with an illustrative embodiment reduces the time to converge the training of a neural network without significant loss of accuracy of the resulting trained neural network.

The illustrative embodiments recognize that presently available floating point formats result in undesirably long compute times, undesirably expensive computations in terms of power and other computing resources, and undesirably complex and large hardware microarchitectures that must be used for cognitive computing workloads, including but not limited to training neural networks. For example, a microarchitecture that uses 128-bit representation must have registers larger enough to store such representations as compared to the microarchitecture that is designed to use only a 32-bit representation. The illustrative embodiments further recognize that the 16-bit format presently used in such computation is regarded as the format with the lowest usable precision and is generally not favored in neural network weights training where high precision in the weight values is desired.

The illustrative embodiments further recognize that double precision (64-bit) and single precision (32-bit) formats representations are structurally complex and prohibitively resource-intensive to use for cognitive computing workloads. The illustrative embodiments recognize that one way to improve both the area and power consumption metrics in cognitive computing is to use small bit-widths floating point representations for performing the majority of the computations. A small portion of the computations, which is very sensitive to rounding errors, can still be performed single precision or double precision format. The small bit-widths floating point representations can be implemented in very low precision (VLP) computation engines, such as FPUs configured to use less bits than the lowest floating point format available today. For example, an FPU can be configured with an 8-bit format.

The present state of the technological field of endeavor of FPUs presently does not recognize or implement such very low precision formats (VLP format, VLP formats). A need exists for reducing the area in which the FPU can be implemented to improve the area metric of cognitive computations. A need exists that such reduction be implemented in hardware and firmware in such a way that the computations used in the training of neural networks, which use a very low precision format, still converge with a trained network that exhibits an accuracy substantially similar to the accuracy achieved with the presently used single or double precision formats. A need exists that such mitigation also not increase other computation costs, such as computation time, but preferably improve the time metric as well in cognitive computing.

The illustrative embodiments recognize that the presently available tools or solutions do not address these needs/problems or provide adequate solutions for these needs/problems. The illustrative embodiments used to describe the invention generally address and solve the above-described problems and other related problems by very low precision floating point representation.

An embodiment can be implemented as a combination of certain hardware components and a software application. An implementation of an embodiment, or one or more components thereof, can be configured as a modified FPU, which is operated using a hardware, software, or firmware operating component. An embodiment can be configured as a modified, with a companion software application executing in some combination of (i) the modified FPU itself, (ii) a data processing system communicating with the modified FPU over a suitable network, or (iii) some combination of (i) and (ii).

Representation of numbers using floating point formats presents three specific problems. First, the representation must somehow represent the concept of infinity. Second the representation must also have a way of representing "Not a Number" or "NaN", such as the result of a square-root of a negative number. Third, the representation must have a way of representing denormal or subnormal numbers, which are those small values or numbers that fall between all exponent and fraction bits (excluding the sign bit) in the representation being at binary 0 and only the lowest exponent bit in the representation being at binary one with all other exponent and fraction bits (excluding the sign bit) in the representation being at binary 0. The fraction bits are also interchangeably referred to herein as "mantissa" bits.

Any reference to "very low precision" format is a reference to a floating point format that uses less than 16 bits. Only as a non-limiting example, the illustrative embodiments described herein use an 8-bit floating point format for the clarity of the description. From this disclosure, those of ordinary skill in the art will be able to adapt an embodiment to many other floating point formats, such as using a number of bits ranging from 9 bits to 64 bits, or even using a number of bits less than 8 bits for some applications, and the same are contemplated within the scope of the illustrative embodiments.

An embodiment configures an FPU to operate using a hybrid format of non-limiting example 8 bits. A hybrid format includes a format configured to represent numbers during a forward pass of a neural network and a second format configured to represent numbers during a backward pass of the neural network. Hereinafter, any reference to an FPU is a reference to an FPU that has been configured by an embodiment to use a hybrid format, unless expressly distinguished where used.

The embodiment divides the 8 available bits into three portions as follows—(i) 1 bit is reserved for indicating a sign, i.e., whether the represented number is positive or negative. In the illustrative embodiments this bit is assumed to be the highest of the 8 bits but could be any of the 8 bits in a suitably configured FPU. (ii) n number of bits out of the remaining bits are reserved to represent the exponent and can be located anywhere in the total bits of the format in a suitably configured FPU. In one non-limiting example format described and used herein, n=5. (iii) p number of remaining bits (total number of bits minus n bits minus 1 bits), which can be located anywhere in the total bits of the format in a suitably configured FPU, are reserved to represent a fraction. In one non-limiting example format described and used herein, p=2.

An embodiment configures an FPU to use a first non-limiting example 8-bit very low precision format. The embodiment apportions the 8-bit format as (sign, exponent, fraction)=(1,5,2). An embodiment configures an FPU to use a second non-limiting example 8-bit very low precision format. The embodiment apportions the 8-bit format as (sign, exponent, fraction)=(1,6,1).

The embodiment configures the FPU to represent infinity as well as NaN when the exponent bits and the mantissa bits are all set to binary 1, regardless of the binary value of the sign bit. Thus, the embodiment does not distinguish between infinity and NaN because such distinction has limited utility, if any, in the types of applications where the embodiment is used, such as in training a neural network.

The embodiment configures the FPU to represent zero when the exponent bits and the mantissa bits are all set to binary 0, regardless of the binary value of the sign bit. Thus, the embodiment does not distinguish between negative zero and positive zero because such distinction has limited utility, if any, in the types of applications where the embodiment is used, such as in training a neural network.

An embodiment further configures the FPU to recognize only as many small value equivalents of denormals as the number of values possible using only the mantissa bits. For example, if only two mantissa bits are used, then only four values can be represented in 2 bits, namely, binary 00, 01, 10, and 11. Accordingly, only four small value equivalents of denormals between the number zero and up to and including the next lowest number are recognized. As another example, if only one mantissa bit is used, then only two values can be represented in one bit, namely, binary 0 and 1. A small value is rounded to one of the small value equivalents using a "rounding nearest up" method.

The general equation for the example format (1,5,2) can be written as $$(-1)^s * 2^{(e-b)} * (2-f/4)$$

where: s=0 or 1 (1 bit)
e goes from 0 to 31 (5 bits)
f goes from 0 to 3 (2 bits)
b is a bias, e.g., 15

The representation of a few different numbers according to this equation becomes:
00000 00→0
00000 01→$2^{(-15)}*1.75$
00000 10→$2^{(-15)}*1.5$
00000 11→$2^{(-15)}*1.25$
00001 00→$2^{(-14)}*2.00$
00001 01→$2^{(-14)}*1.75$
00001 10→$2^{(-14)}*1.5$
00001 11→$2^{(-14)}*1.25$
00010 00→$2^{(-13)}*2.00$
00010 01→$2^{(-13)}*1.75$
00010 10→$2^{(-13)}*1.5$
00010 11→$2^{(-13)}*1.25$
11111 00→$2^{(16)}*2.00$
11111 01→$2^{(16)}*1.75$
11111 10→$2^{(16)}*1.5$
11111 11→nan/infinity All cases where the lower 7 bits are not (all 0s) or (all 1s) follow the equation above.

The above example is described and used herein based on the non-limiting example format that uses only 2 mantissa bits. Accordingly, these examples of numbers of fractions, the sizes of each fraction, and the resulting rounded up represented approximate values are not intended to be limiting. From this disclosure, those of ordinary skill in the art will be able to adapt an embodiment to many other formats where different numbers of mantissa bits are used. Such adaptations will result in correspondingly different numbers of fractions, the sizes of each fraction, and the resulting rounded represented approximate values—rounded up or down in a manner described herein, and such adaptations and results are contemplated within the scope of the illustrative embodiments.

For an 8 bit format, the 1,5,2 format can be modified to use 6 exponent bits and 1 mantissa bit.
For 1,6,1 case, the equation will be:

$$(-1)^s * 2^{(e-b)} * (2-f/2)$$

where: s=0 or 1 (1 bit)
e goes from 0 to 63 (6 bits)
f goes from 0 to 1 (1 bits)
b is a bias, e.g., 31

For a 9 bit format, the 1,5,2 format can be modified to use 5 exponent bits and 3 mantissa bits, or 6 exponent bits and 2 mantissa bits
For 1,5,3 case, the equation will be:

$$(-1)^s * 2^{(e-b)} * (2-f/8)$$

where: s=0 or 1 (1 bit)
e goes from 0 to 31 (5 bits)

f goes from 0 to 7 (3 bits)
b is a bias, e.g., 15
For 1,6,2 case, the equation will be:

$$(-1)^s * 2^{(e-b)} * (2-f/4)$$

where: s=0 or 1 (1 bit)
e goes from 0 to 63 (6 bits)
f goes from 0 to 3 (2 bits)
b is a bias, e.g., 31

Furthermore, instead of rounding nearest up, an implementation can configure an embodiment to use "rounding nearest down" method for small number equivalents. Such adaptation is contemplated within the scope of the illustrative embodiments.

In an experiment, an implementation of an embodiment described herein operated an FPU configured with a hybrid first very low precision 8-bit floating point format. The implementation computed substantially all training computations in an experimental training of a specific neural network. The experiment operated the FPU with a first VLP 8-bit floating point format representing numbers during forward passes of the specific neural network and a second VLP 8-bit floating point format representing numbers during backward passes of the specific neural network. The experiment comparatively performed the training computations, starting the same neural network from the same initial conditions, using prior-art FPUs which were configured to use the low precision (16-bit) floating point format. The experiment concluded with the trained values (weights) of the neural network converging (when the network is considered trained) in each case. The experiment determined that the trained networks from both trainings were of similar accuracy (within a negligible tolerance), and in similar number of epochs (similar amounts of time). The hybrid very low precision FPU was comparatively advantageous over the prior-art low precision FPU in having a better area metric owing to almost one-half the area needed to implement the very low precision FPU as compared to the area needed for the low precision FPU. The very low precision FPU was comparatively advantageous over the prior-art low precision FPU in having a better power metric owing to almost one-half the power needed to operate the very low precision FPU as compared to the power needed for the low precision FPU.

The manner of hybrid floating point representation described herein is unavailable in the presently available methods in the technological field of endeavor pertaining to specialized computation circuits, and especially FPUs. A method of an embodiment described herein, when implemented to execute on a device or data processing system, comprises substantial advancement of the functionality of that device or data processing system in providing a modified FPU which is less complex, is a smaller circuit configuration, produces a neural network training with insignificant deviation from the same network trained using larger floating point formats, and concludes the training in the same amount of time or less, as compared to a prior-art larger floating point format FPU.

The illustrative embodiments are described with respect to certain types of specialized computation circuits, FPUs, memories, bit-widths, formats, representations, special condition handling, apportionments, fraction sizes, numbers of fractions, tolerances, results, algorithms, equations, neural network configurations, locations of embodiments, additional data, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 1:
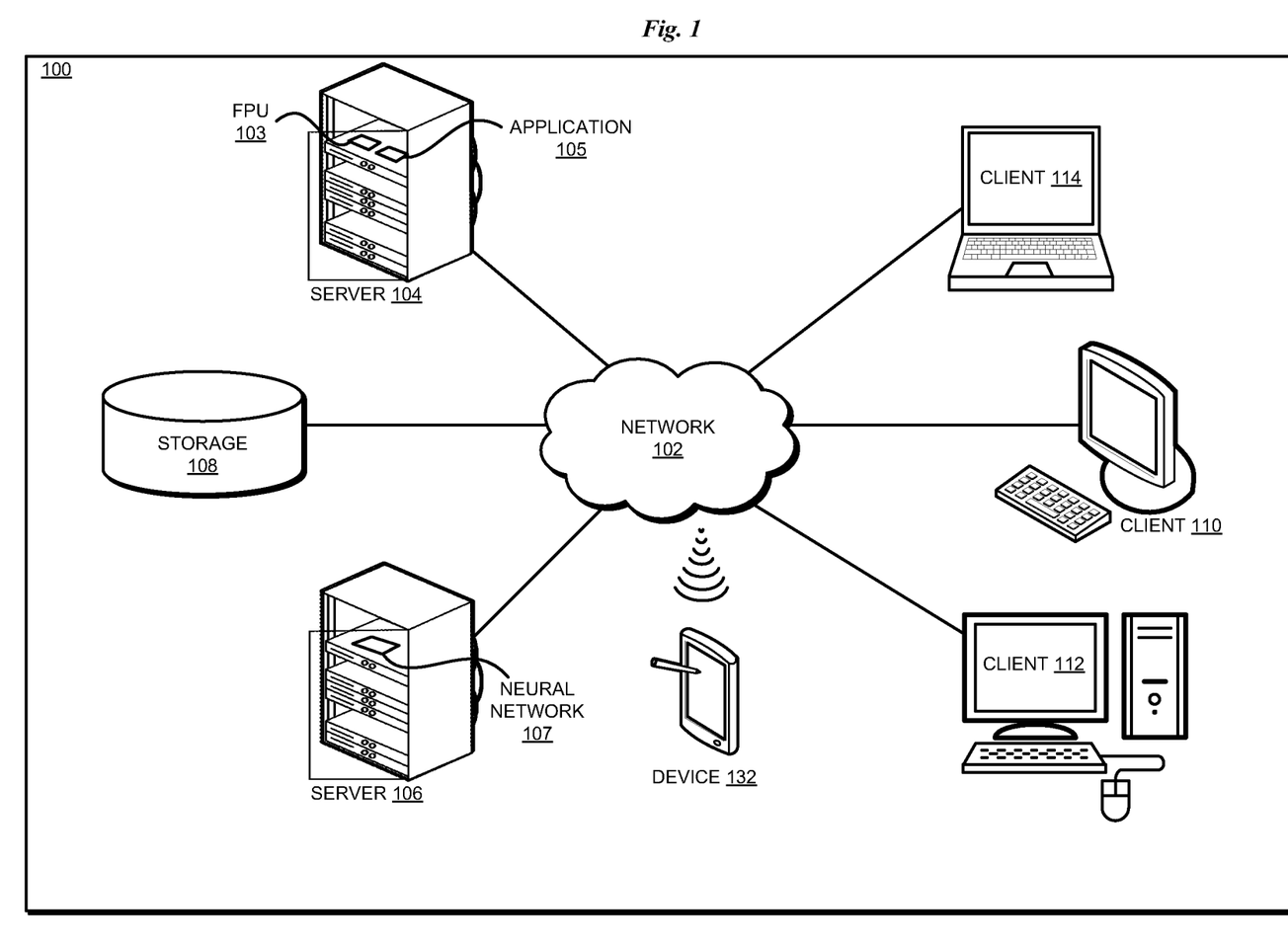
FIG. 1 depicts a block diagram of a network of data processing systems in which illustrative embodiments may be implemented.
Figure 2:
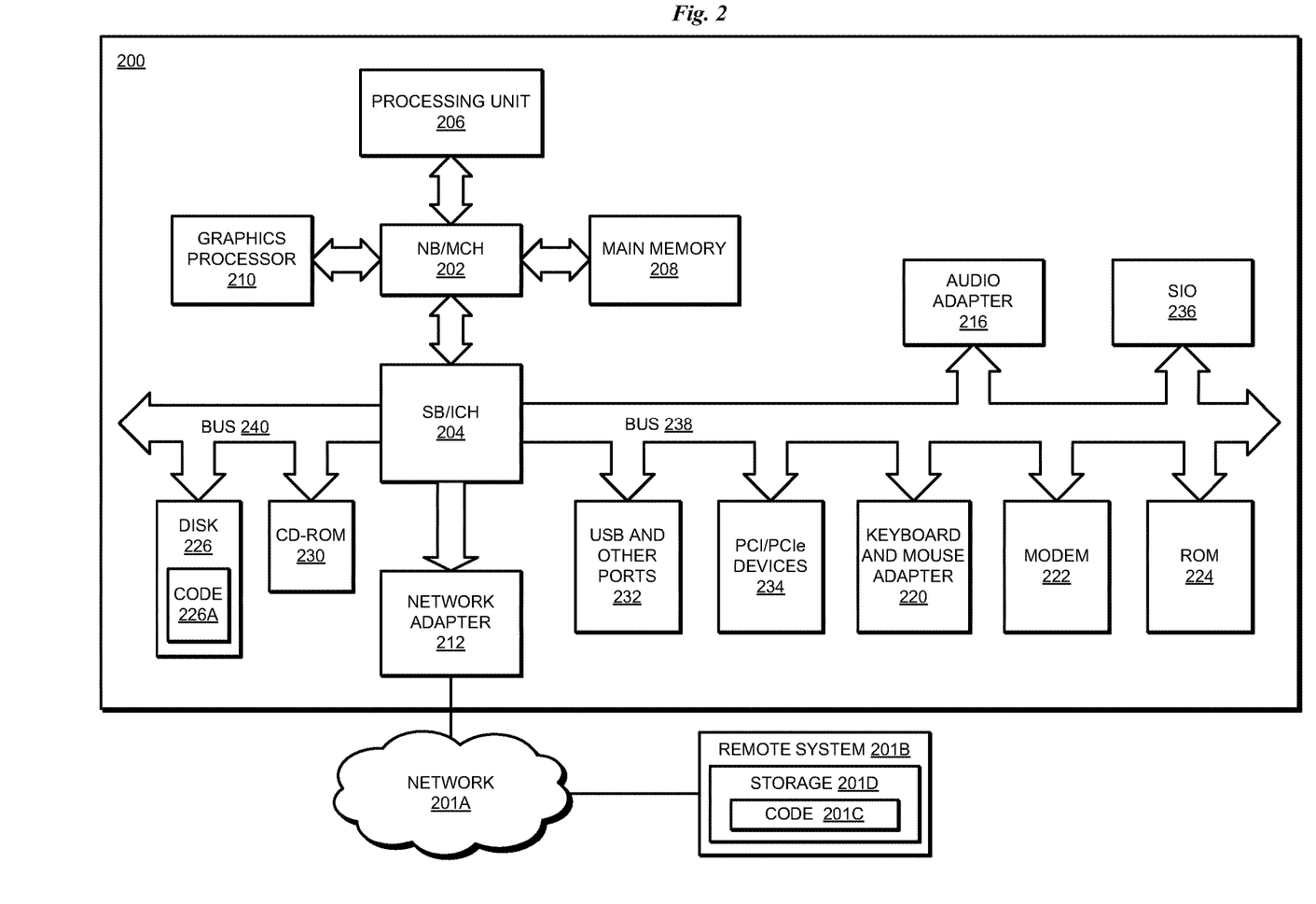
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as examples and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Assume that FPU 103 is a modified FPU according to an embodiment and is configured to operate in server 104. For example, server 104 may be participating in training or configuring neural network 107. Application 105 implements an operating component to configure FPU 103, provide program instructions to FPU 103, or otherwise operate FPU 103 for training neural network 107 or for other floating point computations. Application 105 can be implemented in hardware, software, or firmware. Application 105 can be implemented within FPU 103, outside FPU 103 but in server 104, or even outside server 104 in another data processing system across data network 102, e.g., in server 106.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/ output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
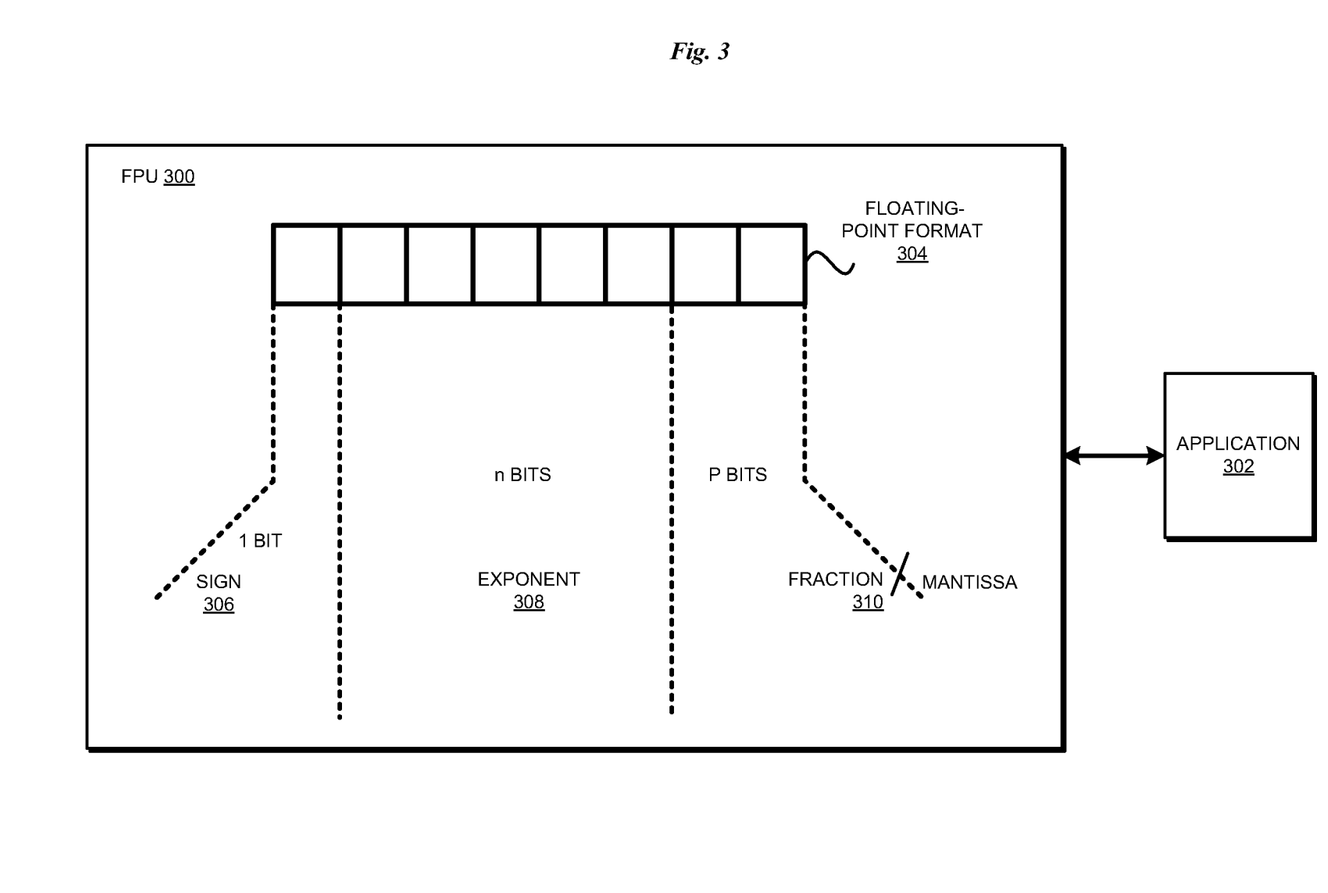
FIG. 3 depicts a block diagram of an example configuration for floating point representation in accordance with an illustrative embodiment.

With reference to FIG. 3, this figure depicts a block diagram of an example configuration for floating point representation in accordance with an illustrative embodiment. FPU 300 is an example of FPU 103 in FIG. 1. Application 302 is an example of application 105 in FIG. 1.

Application 302 configures memory bits in FPU 300 as floating point format 304. Format 304 is configured using 8 bits as a non-limiting example described herein. In an embodiment, highest 1 bit is reserved as sign bit 306, next lower 5 bits are reserved as exponent bits 308, and the lowest 2 bits are reserved as mantissa bits 310. In an embodiment (not shown), highest 1 bit is reserved as sign bit 306, next lower 6 bits are reserved as exponent bits 308, and the lowest bit is reserved as a mantissa bit 310.

Figure 4:
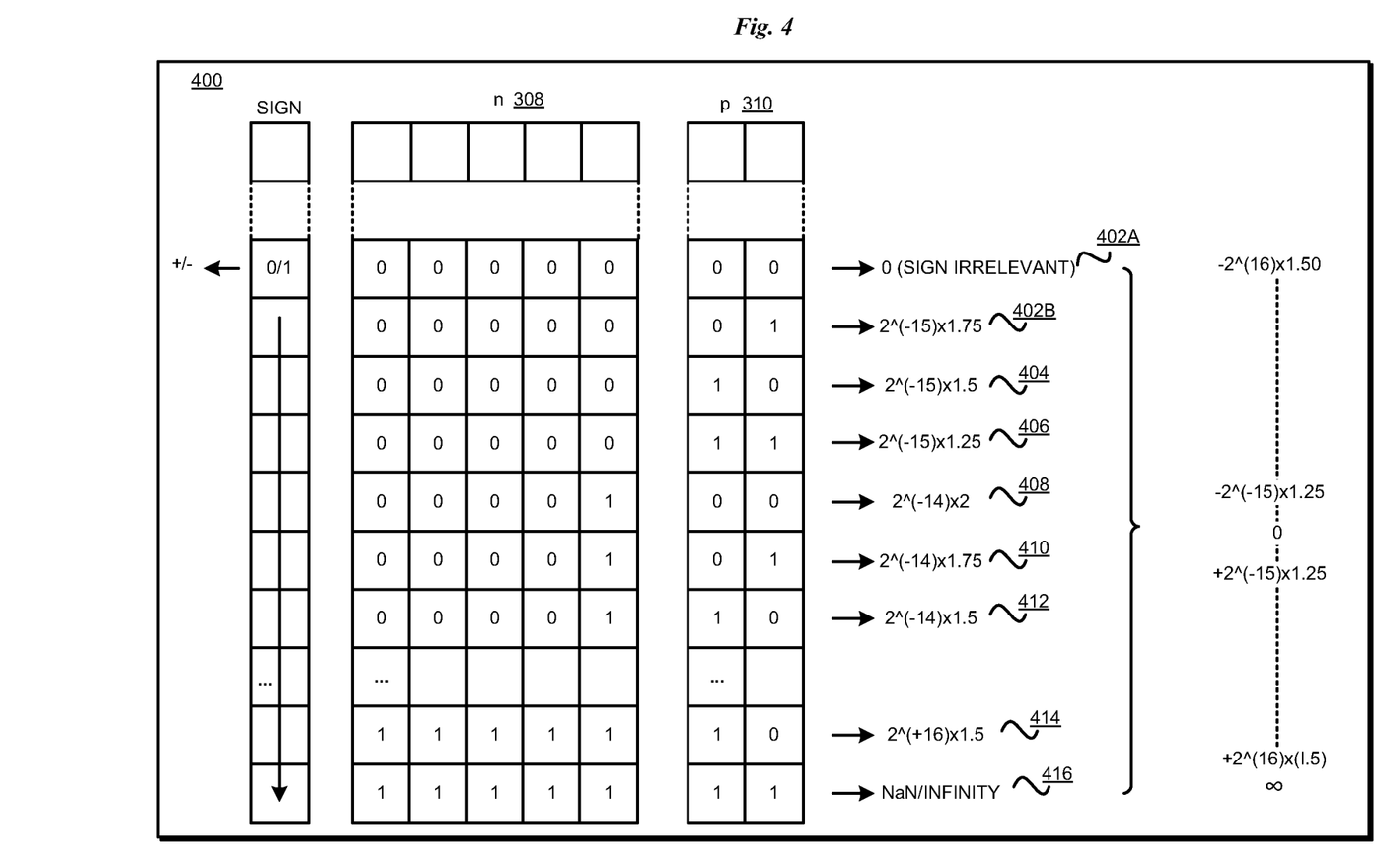
FIG. 4 depicts a block diagram of an example manner of interpreting a floating point format in accordance with an illustrative embodiment.

With reference to FIG. 4, this figure depicts a block diagram of an example manner of interpreting a floating point format in accordance with an illustrative embodiment. Portions 306, 308, and 310 are the corresponding portions from format 304 in FIG. 3.

For the moment, ignore the binary value stored in sign bit 306. The smallest binary value that can be stored in exponent bits 308 and mantissa bits 310 is binary 00000 and 00, respectively, as shown in row 402A. As described herein, application 302 configures FPU 300 to recognize this condition of bits 308 and 310 as representing the number zero. The binary value stored in sign bit 306 is irrelevant for the representation of row 402A.

The next lowest binary value that can be stored in bits 308 and 310 is 00001 and 01, respectively, as shown in row 410. As described herein, because mantissa bits 310 uses 2 bits, the number space between the representation of row 402A and row 408 is divided into four quarters. Rows 402B, 404, 406 and 408 correspond to these four quarters.

Application 302 programs FPU 300 to interpret or recognize the binary value 00000 01 held in bits 308 and 310 in a novel manner. FPU 300 interprets bits 308 and 310—not in the manner of interpreting binary 0000001 as decimal 1, or in the manner of a floating point specification for 16 or more bits representation—but in the following manner—

Row 404 represents one additional quarter fraction below the number represented in row 402B. Bits 308 can be set to a minimum binary 00000 (lower bound number of row 402B). Therefore, the smallest number representable by the 5 exponent bits in bits 308 is $2^{(-15)}$. Therefore, bits 308 and 310 in row 404 represent the value $2^{(-15)}*1.5$.

Row 406 represents one additional quarter fraction below the number represented in row 404. Therefore, bits 308 and 310 in row 406 represent the value $2^{(-15)}*1.25$. Likewise, bits 308 and 310 in row 408 represent the value $2^{\wedge}(-14)$ *2=$2^{\wedge}(-13)$; and bits 308 and 310 in row 410 represent the value $2^{\wedge}(-14)*1.75$.

FPU 300 is programmed to interpret or compute the represented values of other binary contents of bits 308 and 310 in a similar manner. For example, bits 308 and 310 in row 412 represent the value $2^{\wedge}(-14)*1.50$; bits 308 and 310 in row 414 represent the value $2^{\wedge}(16)*1.50$; and so on.

The largest binary content that bits 308 can be set to is 11111. Therefore, the largest number representable by the 5 exponent bits in bits 308 is $2^{\wedge}(+16)$. Therefore, in row 414, FPU 300 computes 11111 10 in bits 308 and 310 respectively as $2^{\wedge}(+16)*1.50$. In row 418, as described herein, application 302 configures FPU 300 to recognize this condition of bits 308 and 310 as representing Infinity as well as NaN.

Thus, the modified FPU using an example 8-bit floating point format of (1,5,2) is usable to represent numbers from negative $2^{\wedge}(+16)*1.50$, through negative $2^{\wedge}(-15)*1.25$, through positive or negative zero, through positive $2^{\wedge}(-15)*1.25$, through positive $2^{\wedge}(+16)*1.50$, through infinity or NaN. This range has been found to be sufficient for the purposes of training neural networks and other cognitive systems, and the precision represented therein has been found to have an insignificant effect on the accuracy of the training as compared to low precision or single precision or even higher precision-based training.

Figure 5:
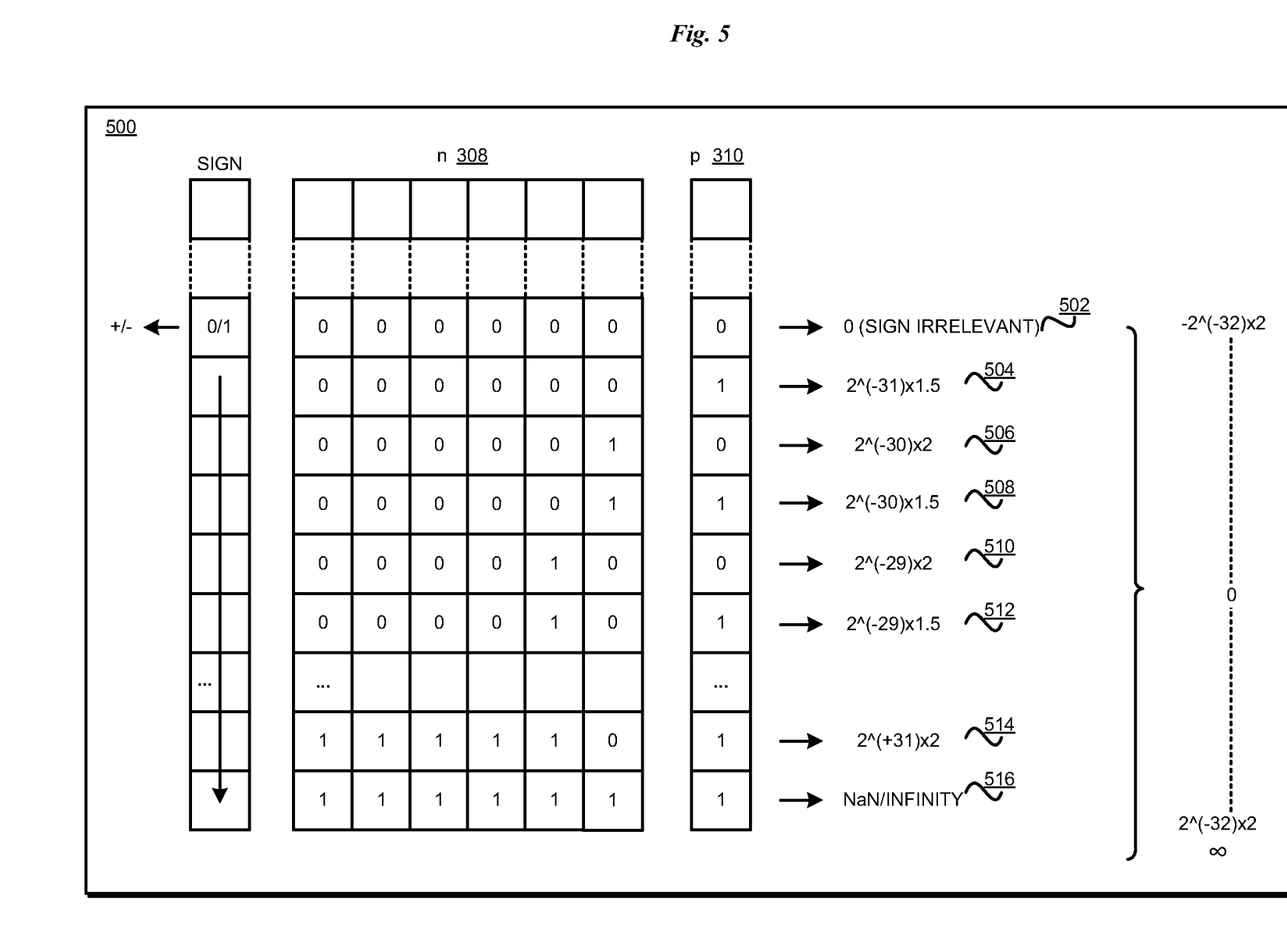
FIG. 5 depicts a block diagram of an example manner of interpreting a floating point format in accordance with an illustrative embodiment.

With reference to FIG. 5, this figure depicts a block diagram of an example manner of interpreting a floating point format in accordance with an illustrative embodiment. Portions 306, 308, and 310 are the corresponding portions from format 304 in FIG. 3. In an embodiment, portion 308 contains 6 bits. In an embodiment, portion 310 contains 1 bit.

For the moment, ignore the binary value stored in sign bit 306. The smallest binary value that can be stored in exponent bits 308 and mantissa bit 310 is binary 000000 and 0, respectively, as shown in row 502. As described herein, application 302 configures FPU 300 to recognize this condition of bits 308 and 310 as representing the number zero. The binary value stored in sign bit 306 is irrelevant for the representation of row 502.

The next lowest binary value that can be stored in bits 308 and 310 is 000001 and 1, respectively, as shown in row 508. As described herein, because mantissa bit 310 uses 1 bit, the number space between the representation of row 502 and row 410 is divided into two halves. Rows 504 and 506 correspond to these two halves.

Application 302 programs FPU 300 to interpret or recognize the binary value 000001 1 held in bits 308 and 310 in a novel manner. FPU 300 interprets bits 308 and 310—not in the manner of interpreting binary 0000001 as decimal 1, or in the manner of a floating point specification for 16 or more bits representation—but in the following manner—

Row 504 is lower bound number of row 502+one half fraction, i.e., (lower bound number of row 502)*1.5. Bits 308 can be set to a minimum binary 000000 (lower bound number of row 502). Therefore, the smallest number representable by the 6 exponent bits in bits 308 is $2^{\wedge}(-31)$. Therefore, bits 308 and 310 in row 504 represent the value $2^{\wedge}(-31)*1.5$.

FPU 300 is programmed to interpret or compute the represented values of other binary contents of bits 308 and 310 in a similar manner. For example, bits 308 and 310 in row 508 represent the value $2^{\wedge}(-30)*1.5$; bits 308 and 310 in row 512 represent the value $2^{\wedge}(-29)*1.5$; and so on.

The largest binary content that bits 308 can be set to is 111111. Therefore, the largest number representable by the 6 exponent bits in bits 308 is $2^{\wedge}(+31)$. Therefore, FPU 300 computes 111111 0 in bits 308 and 310 respectively as $2^{\wedge}(+31)*2$. In row 516, as described herein, application 302 configures FPU 300 to recognize this condition of bits 308 and 310 as representing Infinity as well as NaN.

Thus, the modified FPU using an example 8-bit floating point format of (1,6,1) is usable to represent numbers from negative $2^{\wedge}(32)*2$=negative $2^{\wedge}(33)$, through negative $2^{\wedge}(-31)*1.5$, through positive or negative zero, through positive $2^{\wedge}(-31)*1.5$, through positive $2^{\wedge}(32)*2$=positive $2^{\wedge}(33)$, through infinity or NaN. This range has been found to be sufficient for the purposes of training neural networks and other cognitive systems, and the precision represented therein has been found to have an insignificant effect on the accuracy of the training as compared to low precision or single precision or even higher precision-based training.

Figure 6:
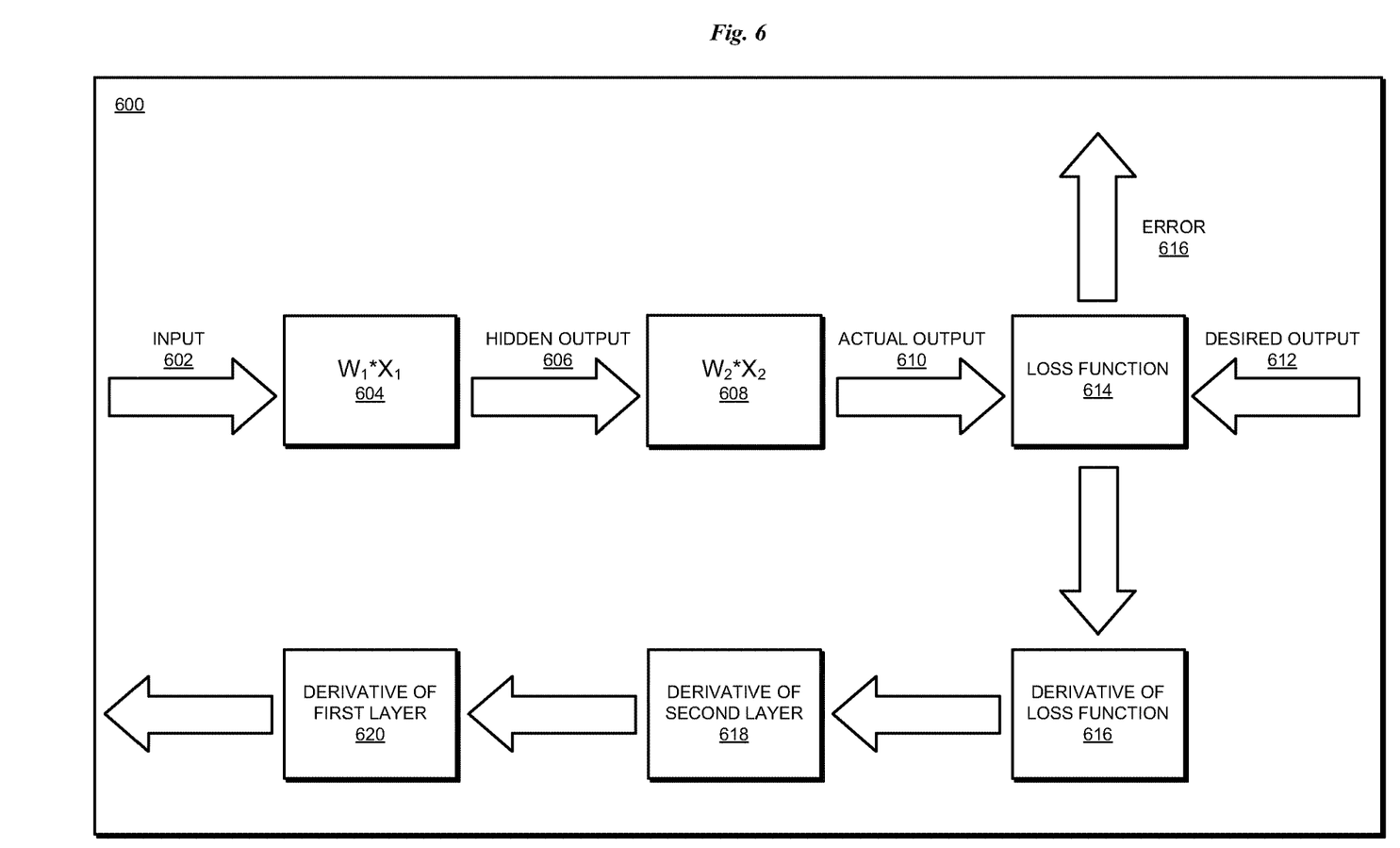
FIG. 6 depicts a block diagram of a configuration of a deep learning network in accordance with an illustrative embodiment.

With reference to FIG. 6, this figure depicts a block diagram of a configuration of a deep learning network in accordance with an illustrative embodiment. Deep learning network 600 includes first layer 604 and second layer 608. First layer 604 receives input 602 from a set of training data and applies a weight, $w_1$, to generate hidden output 606. Second layer 608 receives hidden output 606 and applies a weight, $w_2$, to generate actual output 610. Loss function 614 compares actual output 610 to desired output 612 for input 602 from the set of training data. Loss function 614 calculates error 616 between actual output 610 and desired output 612. A forward pass, or forward propagation, is the process of traversing through a neural network from the first layer to the last layer to generate an output for a given input.

In training a neural network, the goal is to minimize the loss function, or error between the actual output and the desired output. Block 616 calculates the derivative of loss function 614. Block 618 calculates the local derivative of the weight of the second layer. Likewise, block 620 calculates the local derivative of the weight of the first layer. The derivative of loss function 614 includes the local derivatives of the weights of the first layer and the second layer. By altering the weights of the first layer and the second layer according to the calculated error and local derivatives, the neural network moves towards convergence. A backward pass, or backward propagation, is the process of traversing through a neural network from the last layer to the first layer while counting changes in weights of each layer by finding the derivative of the error with respect to each weight.

Figure 7:
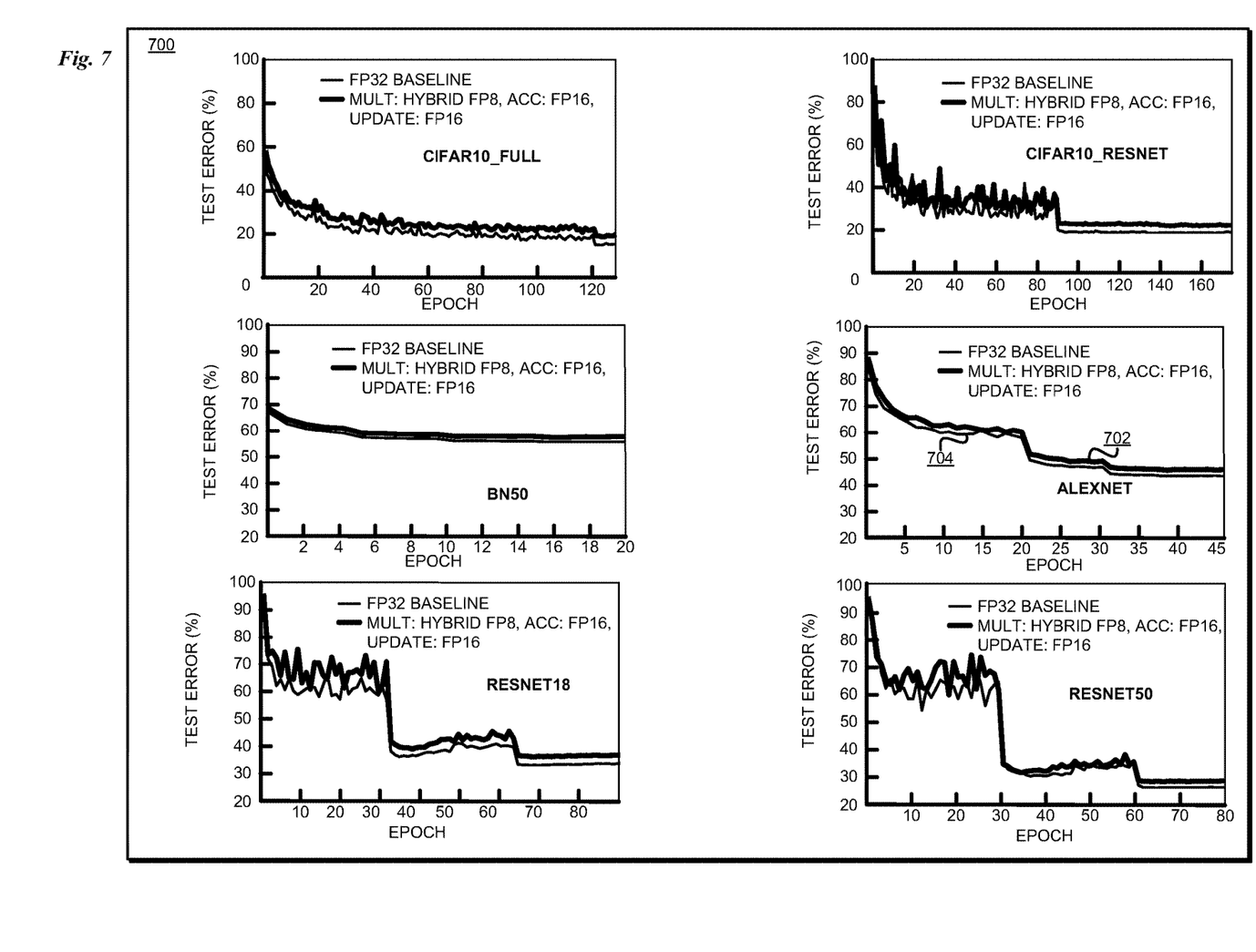
FIG. 7 depicts a graph of a comparative experiment using a hybrid very low precision floating point format in the manner of an illustrative embodiment.

With reference to FIG. 7, this figure depicts a graph of a comparative experiment using a hybrid very low precision floating point format in the manner of an illustrative embodiment. Graph 702 is a convergence plot of computations performed using FPU 300 in training a DNN. Graph 704 is a baseline graph of a convergence to be expected in training the DNN. As can be seen, towards the end of the training, the training loss difference (deviation) between the convergence expected in the baseline graph and using FPU 300 is insignificant.

Figure 8:
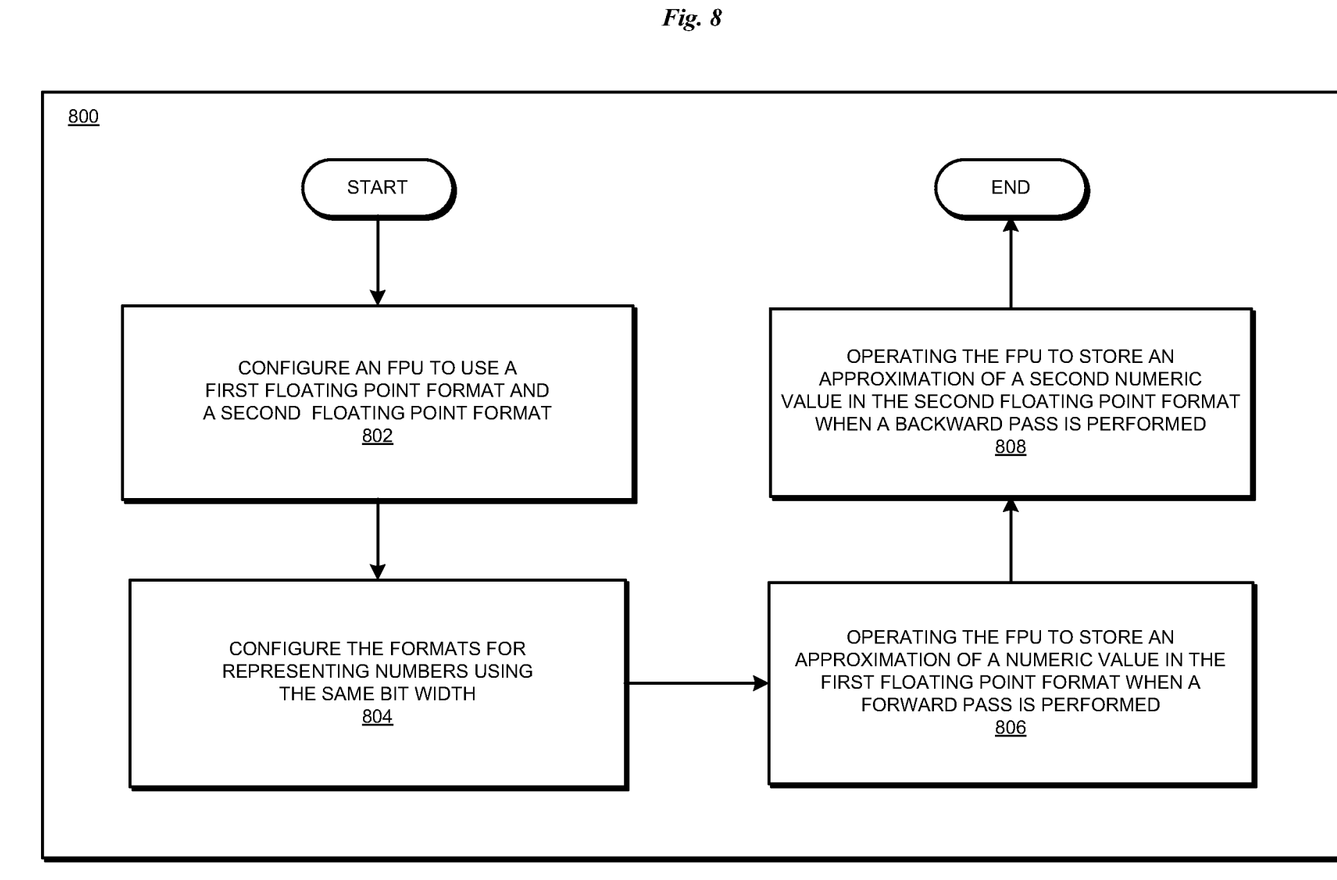
FIG. 8 depicts a flowchart of an example process for hybrid floating point representation in accordance with an illustrative embodiment.

With reference to FIG. 8, this figure depicts a flowchart of an example process for hybrid floating point representation in accordance with an illustrative embodiment. Process 800 can be implemented in application 302 in FIG. 3.

The application configures an FPU to use a hybrid floating point format, e.g., 8-64 bit formats, and preferably an 8-bit format (block 802). The application configures the FPU to use a first format and a second format. The application configures the first format and second format to use some bits as sign bits, some bits as exponent bits, and some bit s as mantissa bits, e.g., (1,4,3); (1,5,2); and (1,6,1) for the 8-bit format.

The application configures the first format and the second format to use the same bit width, e.g., an 8-bit format (block 804). The application operates the FPU to store an approximation of a numeric value in the first format when a forward pass is performed for training a deep learning network (block 806). The application operates the FPU to store an approximation of a second numeric value in the second format when a backward pass is performed for training of the deep learning network (block 808). The application ends process 800 thereafter.

Thus, a computer implemented method, system or apparatus, and computer program product are provided in the illustrative embodiments for hybrid floating point representation and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, including but not limited to computer-readable storage devices as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A processor comprising:
   a specialized circuit configured for floating point computations using numbers represented by a hybrid format, wherein the hybrid format includes a first format and a second format,
   wherein the specialized circuit is operable to store an approximation of a numeric value in the first format during a forward pass for training a deep learning network, and
   wherein the specialized circuit is operable to store an approximation of a second numeric value in the second format during a backward pass for training the deep learning network; and
   wherein the first format and the second format have the same bit width.

2. The processor of claim 1, wherein the bit width of the first format and the second format is 8-bit.

3. The processor of claim 1, wherein the specialized circuit is further configured to apportion the first format and the second format into a sign bit, exponent bits (e), and mantissa bits (p).

4. The processor of claim 3, wherein an exponent bit of the first format is less than an exponent bit of the second format.

5. The processor of claim 3, wherein the first format uses 8-bits, wherein the first format uses five bits as the exponent bits and two bits as the mantissa bits.

6. The processor of claim 3, wherein the second format uses 8-bits, wherein the second format uses six bits as the exponent bits and one bit as the mantissa bit.

7. The processor of claim 3, wherein the approximation of the numeric value is represented as a function of a multiple of a fraction, wherein the fraction is an inverse of a number of discrete values that can be represented using only the mantissa bits.

8. The processor of claim 1, wherein the specialized circuit comprises a floating point unit (FPU).

9. The processor of claim 1, wherein the specialized circuit is further configured to represent, in the hybrid format, infinity in the same manner as a "Not a Number" (NaN) value.

10. The processor of claim 1, wherein the specialized circuit is further configured to disregard, in the hybrid format, the sign bit when representing zero, infinity, and NaN.

11. The processor of claim 1, wherein the hybrid format reserves only two representations, one reserved representation to represent zero and another reserved representation to represent NaN.

12. The processor of claim 1, wherein the hybrid format is a very low precision format (VLP format) comprising less than sixteen bits.

13. A Floating Point Unit (FPU) component of a data processing system comprising:
    a specialized circuit configured for floating point computations using numbers represented by a hybrid format, wherein the hybrid format includes a first format and a second format,
    wherein the specialized circuit is operable to store an approximation of a numeric value in the first format during a forward pass for training a deep learning network, and
    wherein the specialized circuit is operable to store an approximation of a second numeric value in the second format during a backward pass for training the deep learning network; and
    wherein the first format and the second format have the same bit width.

14. The FPU component of claim 13, wherein the bit width of the first format and the second format is 8-bit.

15. The FPU component of claim 13, wherein the specialized circuit is further configured to apportion the first format and the second format into a sign bit, exponent bits (e), and mantissa bits (p).

16. The FPU component of claim 15, wherein an exponent bit of the first format is less than an exponent bit of the second format.

17. The FPU component of claim 15, wherein the first format uses 8-bits, wherein the first format uses five bits as the exponent bits and two bits as the mantissa bits.

18. The FPU component of claim 15, wherein the second format uses 8-bits, wherein the second format uses six bits as the exponent bits and one bit as the mantissa bit.

* * * * *